（12) United States Patent
Chang

(10) Patent No.: US 6,246,135 B1
(45) Date of Patent: Jun. 12, 2001

(54) CENTRIFUGAL SWITCH DEVICE FOR INDUCTION MOTOR

(76) Inventor: Kevin C. Y. Chang, No. 6 Lane 190 San Ming Rd. Feng Yuan, Taichung Hsien (TW)

( * ) Notice: Subject to any disclaimer, the term of this patent is extended or adjusted under 35 U.S.C. 154(b) by 0 days.

(21) Appl. No.: 09/524,623

(22) Filed: Mar. 13, 2000

Related U.S. Application Data

(63) Continuation-in-part of application No. 09/296,388, filed on Apr. 23, 1999.

(51) Int. Cl.[7] .......................... H02K 11/00; H01H 35/10
(52) U.S. Cl. ........................ 310/68 E; 200/80 R
(58) Field of Search .............. 310/68 R, 68 E; 29/596–598; 200/80 R, 83 P, 246, 293, 283, 531, 306, 239; 73/546, 538, 550, 535, 537, 539

(56) References Cited

U.S. PATENT DOCUMENTS

| 2,555,703 | 6/1951 | Restemeier | 310/68 E |
|---|---|---|---|
| 4,095,073 | 6/1978 | Frank | 200/293 |
| 4,272,660 | 6/1981 | Mayer et al. | 200/83 P |
| 4,414,443 | 11/1983 | Gehrt | 200/80 R |
| 4,958,096 | 9/1990 | Kachuk | 310/68 E |
| 5,153,471 | 10/1992 | Ottersbach | 310/68 E |
| 5,293,090 | 3/1994 | Heilman et al. | 310/68 E |
| 5,382,767 | 1/1995 | Takano et al. | 300/531 |
| 5,403,982 | 4/1995 | Nolte et al. | 200/80 R |
| 5,602,436 | 2/1997 | Sherman et al. | 310/68 E |

Primary Examiner—Tran Nguyen
(74) Attorney, Agent, or Firm—Connolly Bove Lodge & Hutz LLP

(57) ABSTRACT

A centrifugal switch device for an induction motor includes a microswitch mounted on the casing of the induction motor, a protective cover mounted on the microswitch for encompassing and contacting the push button of the microswitch, a sliding member secured to the casing and slidably mounted on the shaft, an extension extending outward from the sliding member and having a pressing piece releasably pressing the protective cover for urging the protective cover to press the push button of the microswitch, a fan secured on the shaft to rotate therewith, a pressing disk secured in the fan to rotate therewith and slidably mounted on the shaft for detachably urging the sliding member, two urging members each pivotally mounted on the fan and each attached to the pressing disk for moving the pressing disk on the shaft relative to the sliding member, and two biasing members each mounted on the two urging members for pivoting the two urging members.

1 Claim, 3 Drawing Sheets

CENTRIFUGAL SWITCH DEVICE FOR INDUCTION MOTOR

CROSS-REFERENCES TO RELATED APPLICATIONS

The present invention is a continuation-in-part application of the U.S. Ser. No. 09/296,388, filed on Apr. 23, 1999, now pending.

BACKGROUND OF THE INVENTION

1. Field of the Invention

The present invention relates to a centrifugal switch device, and more particularly to a centrifugal switch device for an induction motor.

2. Description of the Related Art

A common used induction motor usually includes a start circuit for starting the rotation of the motor. The start circuit includes a centrifugal switch for controlling the starting and stopping of the motor, and a capacitor for providing a higher starting force so as to increase the rotational speed of the motor to reach a higher value in a short time. When the rotational speed of the motor reaches 75% of that of its full load, the centrifugal switch is used to cut of connection between the starting motor and the motor so that the rotational speed of the motor will not be increased excessively, and so that the motor is operated at a predetermined normal rotational speed.

A conventional centrifugal switch for an induction motor in accordance with the prior art shown in FIGS. 1 and 2 comprises a switch contact 8 mounted on a casing 1 of the motor and connecting to a start circuit (not shown) for controlling the rotation of the motor, an elastic strip 7 detachably contacting with the switch contact 8, a sliding member 6 mounted on a shaft (not shown) of the motor and having a distal end pressing a distal end of the elastic strip 7, two springs 9 each mounted between the sliding member 6 and the casing 1, a fan 2 secured on the shaft to rotate therewith, a pressing disk 3 secured in the fan 2 to rotate therewith and slidably mounted on the shaft for urging the sliding member 6, two urging members 5 pivotally mounted on the fan 2 and each attached to the pressing disk 3 for moving the pressing disk 3 on the shaft relative to the sliding member 6, and two springs 4 each mounted on the two urging members 5 for pivoting the two urging members 5.

In operation, the pressing disk 3 is initially pushed toward the sliding member 6 by the two urging members 5 and the two springs 4 to move the sliding member 6 toward the casing 1 to press the elastic strip 7 which then touches the switch contact 8 as shown in FIG. 1 so that the centrifugal switch device can be disposed in a state of "ON", thereby allowing the induction motor electrically connecting to a start circuit (not shown) so as to start the induction motor.

When the rotational speed of the induction motor is increased to reach 75% of that of its full load, the urging members 5 is moved from the position as shown in FIG. 1 to the position as shown in FIG. 2 by means of the centrifugal force generated by the high speed rotation of the shaft to move the pressing disk 3 away from the sliding member 6 so that the sliding member 6 is moved toward the pressing disk 3 by the restoring force of the springs 9 so as to move the sliding member 6 from the position as shown in FIG. 1 to the position as shown in FIG. 2, thereby detaching the switch contact 8 from the elastic strip 7 so that the centrifugal switch device is disposed in a state of "OFF", and the start circuit is disconnected. In such a manner, the rotational speed of the induction motor will not be increased due to the power supplied from the centrifugal switch device is cut off so that the induction motor is rotated at a normal speed.

However, heat is easily created by high friction while the sliding member 6, the elastic strip 7 and the switch contact 8 are in contact with each other during the operation. In addition, the switch is not provided with a registering apparatus for regulating the parts such that they have a tendency of sliding out of position. Further, the parts are easily attached by dirt or dust. Accordingly, the disadvantages will result in poor connection of electricity and destruction of the parts of the motor, thereby increasing difficulties of operation and costs of maintenance.

The closest prior arts of which the applicant is aware are disclosed in U.S. Pat. No. 5,602,436 to Sherman et al.; U.S. Pat. No. 2,555,703 to Restemeier; and U.S. Pat. No. 4,272,660 to Mayer et al.

In the Sherman reference, it discloses a shaft 9, a flange 25, a sleeve 17, a table 30, a contact 27, a switch 28, a spring 34, and a weight 31. The table 30 engages the contact 27 of the switch 28, and the spring 34 biases the table 30 normally away from the contact 27 toward the flange 25 so that the switch 28 is not normally closed. When the rotational rate of the shaft 9 reaches a predetermined speed, the weights 31 pivot outward to move the flange 25 along the sleeve 17 so as to engage the table 30. The table 30 is then urged downward to depress the contact 27 and actuate the switch 28 to disengage the starting winding so that the switch 28 is actuated at an appropriate speed.

In the Restemeier reference, it discloses a disc 24 which is embossed to provide an annular rim portion 30 which is adapted to engage a button 31 forming a part of a microswitch 32. When the motor is idle, the coil spring 29 insures that the rim 30 of the disc 24 will be in contact with the button 31 to hold the electrical contacts in engagement with the microswitch, thereby enabling the motor to start rotating. As the speed of the motor increases, the arms 20 and 22 are urged in a radially outward direction by the centrifugal force, and this outward movement of the arms 20 and 22 is translated into axial movement of the disc 24 so that the button 31 is released, the contacts associated with the microswitch are opened, and flow of current to the starting winding of the motor is thereby stopped. However, the disc 24 is secured on a sleeve 27 which is slidably secured on the shaft 17 of the motor to rotate herewith. Therefore, the disc 24 is rotated with the shaft 17 so that the rim portion 30 constantly and continuously contacts with the button 31 during the rotation of the shaft 17, thereby easily creating high heat due to friction, and thereby easily wearing the button 31.

SUMMARY OF THE INVENTION

In accordance with one aspect of the present invention, there is provided a centrifugal switch device for an induction motor. The induction motor includes a casing having a side wall, and a shaft rotatably mounted on the casing.

The centrifugal switch device comprises a microswitch mounted on the side wall of the casing and including a push button protruding outward therefrom; a protective cover mounted on the microswitch for encompassing and contacting the push button of the microswitch and the protective cover including a stub protruding therefrom; a sliding member secured to the casing and slidably mounted on the shaft, an extension extending outward from the sliding member to move therewith and including a pressing piece releasably pressing the protective cover for urging the protective cover to press the push button of the microswitch, the pressing piece defining a through hole for receiving the stub of the protective cover; a fan secured on the shaft to rotate therewith; a pressing disk secured in the fan to rotate therewith and slidably mounted on the shaft for detachably urging the sliding member; a pad movably mounted on the shaft and located between the sliding member and the pressing disk; two urging members each pivotally mounted on the fan and each attached to the pressing disk for moving the pressing disk on the shaft relative to the sliding member; and two biasing members each mounted on the two urging members for pivoting the two urging members.

The casing includes two flanges extending outward therefrom and each defining a receiving chamber and a screw bore. The sliding member defines two holes each respectively aligning with the receiving chamber of each of the two flanges of the casing. The centrifugal switch device further comprises two retaining bolts each extending through the hole of the sliding member into the receiving chamber and each screwed into the screw hole of the flange of the casing, and two restoring springs each received in the receiving chamber and each biased between the sliding member and a wall of the receiving chamber.

Further benefits and advantages of the present invention will become apparent after a careful reading of the detailed description with appropriate reference to the accompanying drawings.

DETAILED DESCRIPTION OF THE INVENTION

Figure 1:
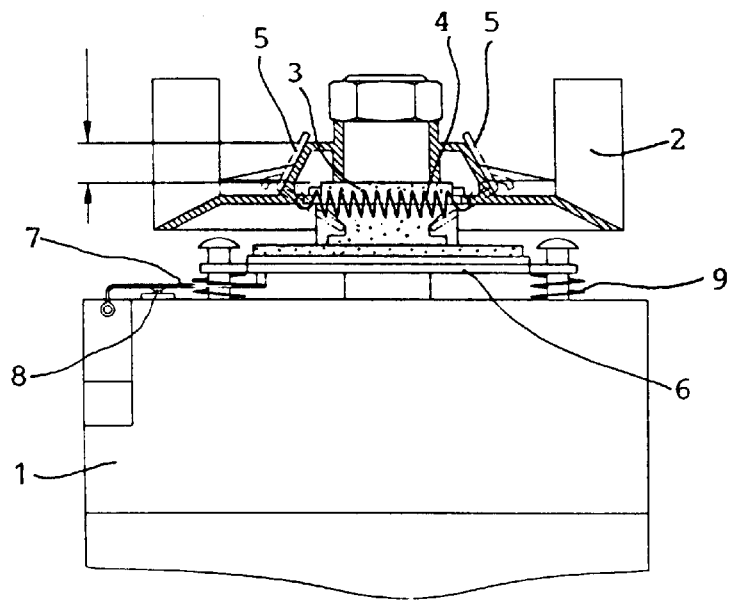
FIG. 1 is a top plan view of a conventional centrifugal switch for an induction motor in accordance with the prior art.
Figure 2:
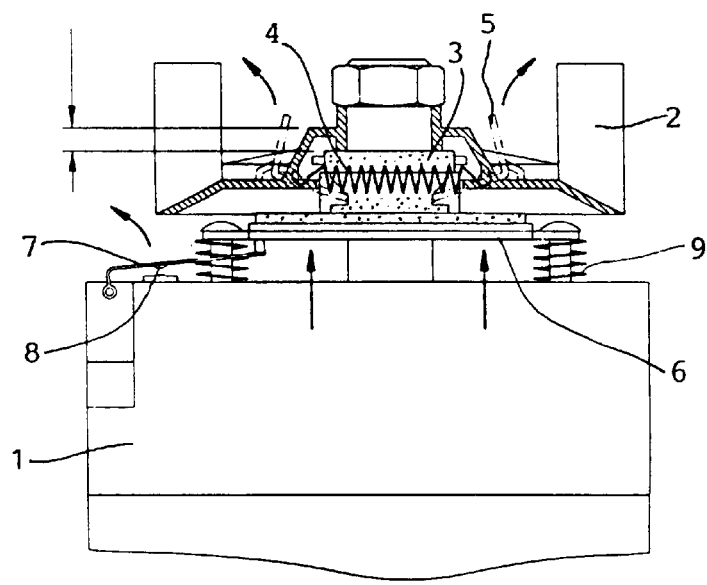
FIG. 2 is an operational view of the centrifugal switch as shown in FIG. 1.
Figure 3:
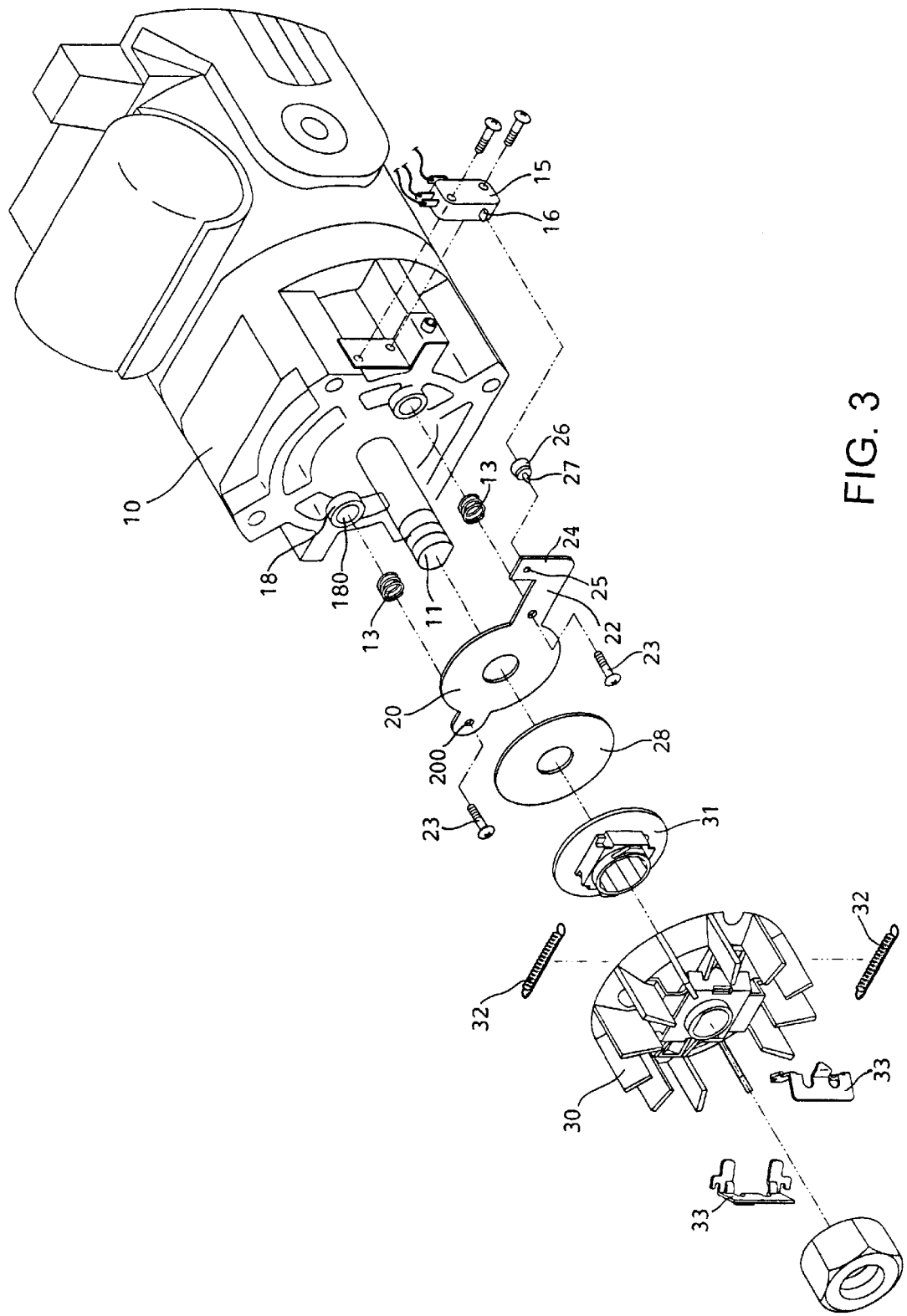
FIG. 3 is an exploded view of a centrifugal switch device for an induction motor in accordance with the present invention.
Figure 4:
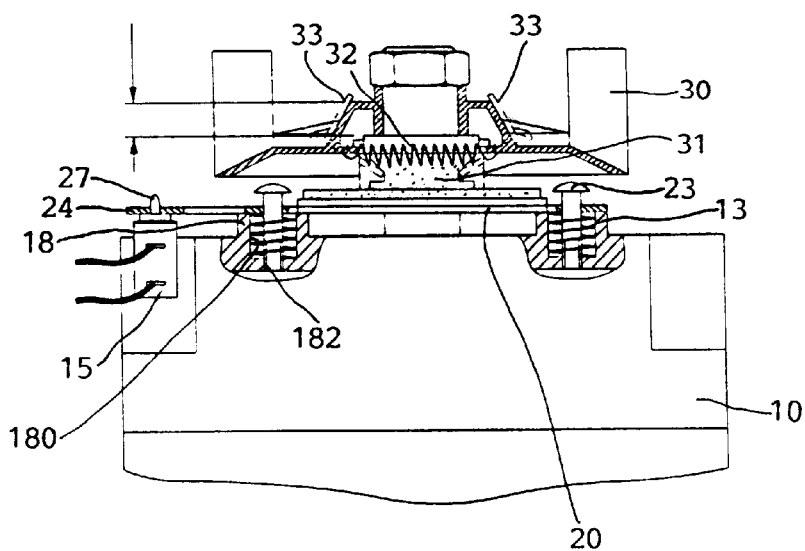
FIG. 4 is a top plan view of the centrifugal switch device as shown in FIG. 1.

Referring to the drawings and initially to FIGS. 3 and 4, a centrifugal switch device in accordance with the present invention is used for an induction motor including a casing 10 having a side wall, and a shaft 11 rotatably mounted on the casing 10.

The centrifugal switch device comprises a microswitch 15 mounted on the side wall of the casing 10 and including a push button 16 protruding outward therefrom, a flexible protective cover 26 mounted on the microswitch 15 for encompassing and contacting the push button 16 of the microswitch 15 and including a stub 27 protruding therefrom, a sliding member 20 secured to the casing 10 and slidably mounted on the shaft 11, an extension 22 extending outward from the sliding member 20 to move therewith and including a pressing piece 24 releasably pressing the protective cover 26 for urging the protective cover 26 to press the push button 16 of the microswitch 15, a through hole 25 defined in the pressing piece 24 for receiving the stub 27 of the protective cover 26, a fan 30 secured on the shaft 11 to rotate therewith, a pressing disk 31 secured in the fan 30 to rotate therewith and slidably mounted on the shaft 11 for detachably urging the sliding member 20, a pad 28 movably mounted on the shaft 11 and located between the sliding member 20 and the pressing disk 31, two urging members 33 each pivotally mounted on the fan 30 and each attached to the pressing disk 31 for moving the pressing disk 31 on the shaft 11 relative to the sliding member 20, and two biasing members 32, such as springs, each mounted on the two urging members 33 for pivoting the two urging members 33.

The casing 10 includes two flanges 18 extending outward therefrom and each defining a receiving chamber 180 and a screw bore 182. The sliding member 20 defines two holes 200 each respectively aligning with the receiving chamber 180 of each of the two flanges 18 of the casing 10. The centrifugal switch device further comprises two retaining bolts 23 each extending through the hole 200 of the sliding member 20 into the receiving chamber 180 and each screwed into the screw hole 182 of the flange 18 of the casing 10, and two restoring springs 13 each received in the receiving chamber 180 and each biased between the sliding member 20 and a wall of the receiving chamber 180.

Figure 5:
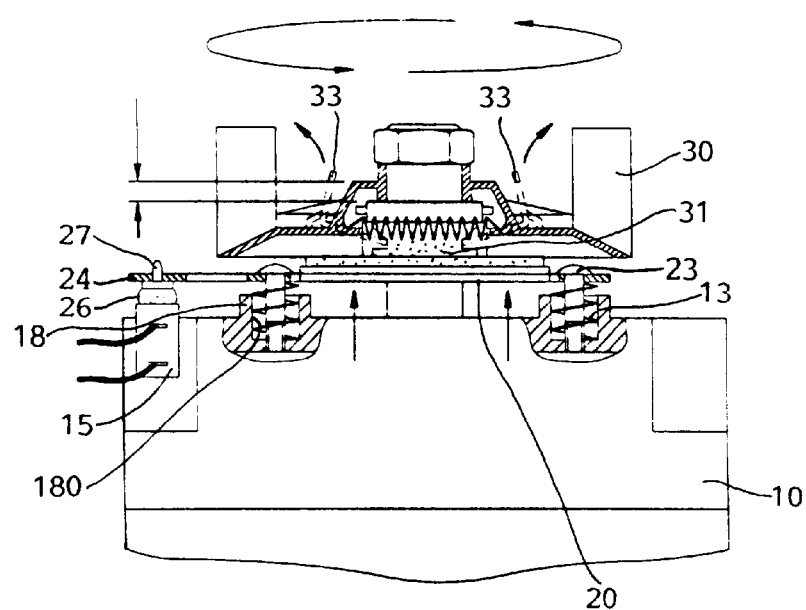
FIG. 5 is an operational view of the centrifugal switch device as shown in FIG. 4.

In operation, referring to FIGS. 4 and 5 with reference to FIG. 3, the pressing disk 31 is initially pushed toward the sliding member 20 by the two urging members 33 co-operating with the two springs 32 so as to move the sliding member 20 toward the casing 10, thereby moving the pressing piece 24 to the position as shown in FIG. 4 so as to press the protective cover 26 which then touches and presses the push button 16 of the microswitch 15 so that the centrifugal switch device can be disposed in a state of "ON", thereby allowing the induction motor electrically connecting to a start circuit (not shown) so as to start the induction motor.

As the induction motor is started, the fan 30, the urging members 33, and the pressing disk 31 are rotated with the shaft 11 of the induction motor synchronously, and the sliding member 20 is not rotated with the shaft 11.

The rotational speed of the induction motor is gradually increased until it reaches a nominally predetermined value. For example, when the rotation speed of the induction motor reaches 75% of that of its full load, the urging members 33 is moved from the position as shown in FIG. 4 to the position as shown in FIG. 5 by means of the centrifugal force generated from high speed rotation of the shaft 11 so as to move the pressing disk 31 away from the sliding member 20 so that the sliding member 20 is moved toward the pressing disk 31 by means of the restoring force of the restoring springs 13 so as to move the pressing piece 24 from the position as shown in FIG. 4 to the position as shown in FIG. 5, thereby removing the force exerted on the protective cover 26 so as to release the push button 16 from the pressing force of the protective cover 26 so that the centrifugal switch device is disposed in a state of "OFF", and the start circuit is disconnected. In such a manner, the rotational speed of the induction motor will not be increased due to the power supplied from the centrifugal switch device is cut off so that the induction motor is rotated at a normal speed.

Accordingly, the protective cover 26 can be used to encompass the microswitch completely, thereby preventing dirt, dust or the like from being attached to the microswitch so as to protect the microswitch. In addition, the sliding member 20 is moved to contact the protective cover 26 by means of the stub 27 guided in the through hole 25 so that the sliding member 20 is actually moved to press the protective cover 26 so as to control the operation of the microswitch 15 precisely, thereby greatly increasing the precise operation of the centrifugal switch device.

Therefore, the centrifugal switch device in accordance with the present invention does not have disadvantages such as heat created by high friction, sliding out of position, and flashes generated by friction, which often appear in the prior art references. Thus, the malfunction of the centrifugal switch device can be greatly reduced, and it prolongs the lifetime of the induction motor.

It should be clear to those skilled in the art that further embodiments may be made without departing from the scope of the present invention.

What is claimed is:

1. A centrifugal switch device for an induction motor, said induction motor including a casing (10) having a side wall, and a shaft (11) rotatably mounted on said casing (10), said casing (10) including two flanges (18) each extending outward therefrom and each defining a receiving chamber (180) and a screw bore (182), said centrifugal switch device comprising:

a microswitch (15) mounted on the side wall of said casing (10) and including a push button (16) protruding outward therefrom;

a protective cover (26) mounted on said microswitch, (15) for encompassing and contacting said push button (16) of said microswitch (15) and said protective cover (26) including a stub (27) protruding therefrom;

a sliding member (20) secured to said casing (10) and slidably mounted on said shaft (11), said sliding member (20) defining two holes (200) each respectively aligning with said receiving chamber (180) of each of said two flanges (18) of said casing (10) an extension (22) extending outward from said sliding member (20) to move therewith and including a pressing piece (24) releasably pressing said protective cover (26) for urging said protective cover (26) to press said push button (16) of said microswitch (15), said pressing piece (24) defining a through hole (25) for receiving said stub (27) of said protective cover (26);

two retaining bolts (23) each extending through said hole (200) of said sliding member (20) into said receiving chamber (180) and each screwed into said screw hole (182) of said flange (18) of said casing (10);

two restoring springs (13) each received in said receiving chamber (180) and each biased between said sliding member (20) and a wall of said receiving chamber (180);

a fan (30) secured on said shaft (11) to rotate therewith;

a pressing disk (31) secured in said fan (30) to rotate therewith and slidably mounted on said shaft (11) for detachably urging said sliding member (20);

a pad (28) movably mounted on said shaft (11) and located between said sliding member (20) and said pressing disk (31);

two urging members (33) each pivotally mounted on said fan (30) and each attached to said pressing disk (31) for moving said pressing disk (31) on said shaft (11) relative to said sliding member (20); and two biasing members (32) each mounted on said two urging members (33) for pivoting said two urging members (33).

* * * * *